(12) United States Patent
Jacobs

(10) Patent No.: US 6,881,701 B2
(45) Date of Patent: Apr. 19, 2005

(54) PHOTOCATALYTIC COMPOSITION AND METHOD FOR PREVENTING ALGAE GROWTH ON BUILDING MATERIALS

(75) Inventor: Jeffry L. Jacobs, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/413,683

(22) Filed: Apr. 15, 2003

(65) Prior Publication Data

US 2003/0190431 A1 Oct. 9, 2003

Related U.S. Application Data

(62) Division of application No. 09/531,187, filed on Mar. 21, 2000, now Pat. No. 6,569,520.

(51) Int. Cl.⁷ .................... B01J 23/00; B01J 21/16; B01J 21/08; C04B 12/04; C04B 14/00

(52) U.S. Cl. .................... 502/300; 502/80; 502/240; 502/242; 502/243; 502/246; 502/249; 502/254; 502/255; 502/259; 502/261; 502/300; 106/600; 106/623; 106/632; 106/635; 106/636; 106/286.1

(58) Field of Search .................... 106/600, 623, 106/632, 635, 636, 286.1–286.8; 502/80, 240, 242–249, 254–255, 258–259, 261, 300

(56) References Cited

U.S. PATENT DOCUMENTS

| | | | |
|---|---|---|---|
| 3,152,903 A | 10/1964 | Shepard et al. | |
| 3,429,706 A | 2/1969 | Shepard et al. | |
| 5,356,664 A | 10/1994 | Narayan et al. | |
| 5,411,803 A | 5/1995 | George et al. | |
| 5,516,573 A | 5/1996 | George et al. | |
| 5,518,992 A | 5/1996 | Linkous | |
| 5,573,782 A | 11/1996 | Bigham et al. | |
| 5,616,532 A | 4/1997 | Heller et al. | |
| 5,658,841 A | 8/1997 | Tanaka et al. | |
| 5,854,169 A | 12/1998 | Heller et al. | |
| 5,880,067 A | 3/1999 | Linkous | |
| 5,897,958 A | 4/1999 | Yamada et al. | |
| 5,916,947 A | 6/1999 | Morris et al. | |
| 5,972,831 A | 10/1999 | Poncelet et al. | |
| 5,994,268 A | 11/1999 | Linkous | |
| 6,013,372 A | 1/2000 | Hayakawa et al. | |
| 6,037,289 A | 3/2000 | Chopin et al. | |
| 6,074,974 A | 6/2000 | Lee et al. | |
| 6,093,676 A | 7/2000 | Heller et al. | |
| 6,238,794 B1 | 5/2001 | Beesley et al. | |
| 6,284,364 B1 | 9/2001 | Sugizaki et al. | |
| 6,368,668 B1 * | 4/2002 | Kobayashi et al. | 427/376.2 |
| 6,569,520 B1 * | 5/2003 | Jacobs | 428/330 |
| 2002/0005145 A1 * | 1/2002 | Sherman | 106/436 |
| 2002/0160151 A1 * | 10/2002 | Pinault et al. | 428/144 |
| 2002/0182334 A1 * | 12/2002 | Marzolin et al. | 427/421 |
| 2003/0027884 A1 * | 2/2003 | Kim et al. | 522/81 |
| 2003/0039848 A1 * | 2/2003 | Murata et al. | 428/448 |

FOREIGN PATENT DOCUMENTS

| | | | |
|---|---|---|---|
| EP | 0 903 389 A1 | 3/1999 | |
| EP | 0 923 988 A1 | 6/1999 | |
| JP | 10-292565 | 11/1998 | |
| JP | 11360311 * | 6/2001 | ............ B05D/5/00 |
| WO | WO 97/45502 | 12/1997 | |

OTHER PUBLICATIONS

"Titanium dioxide catalysts break down pollutants", *C&EN*, Jan. 15, 1996.

"Super–hydrophilic photocatalyst and its application", TOTO Ltd., 1997, no month avail.

Wang et al., "Photocatalytic Decomposition of Halogenated Organics Over Nanocrystalline Titania", MIT Industrial Liaison Program Report, 1997, Jul. 19, 1997.

Patent Abstracts of Japan, JP 10 237354 (Matsushita Electric Works Ltd), Sep. 8, 1998, Abstract.

Zhang et al., "The Role of Particle Size in Nanocrystalline TiO2–based Photocatalysts", MIT Industrial Liaison Program Report, 1999, no month avail.

* cited by examiner

*Primary Examiner*—Mark L. Bell
*Assistant Examiner*—Patricia L. Hailey
(74) *Attorney, Agent, or Firm*—Colene E. Blank

(57) ABSTRACT

The present invention provides a coating composition for substrates. The coating composition of the present invention generally includes a silicate binder and a plurality of photocatalytic particles. The silicate binder functions as a bonding agent to establish the coating on the substrate. A plurality of photocatalyst particles are dispersed throughout the silicate binder. The particles are included in an amount that provides sufficient distribution of the particles in the resulting coating. The incorporation of the present invention onto substrates prevents algal growth on building materials utilizing the coated substrates.

7 Claims, No Drawings

PHOTOCATALYTIC COMPOSITION AND METHOD FOR PREVENTING ALGAE GROWTH ON BUILDING MATERIALS

CROSS REFERENCE TO RELATED APPLICATION

The present application is a divisional of U.S. patent application Ser. No. 09/531,187, filed Mar. 21, 2000, now U.S. Pat. No. 6,569,520, which is incorporated by reference in its entirety herein.

FIELD OF THE INVENTION

The present invention relates to a coating for inorganic substrates, particularly to a coating composition containing photocatalytic particles, and even more particularly to inorganic granules (e.g. roofing granules) coated with such a composition.

BACKGROUND OF THE INVENTION

Inorganic substrates have been coated with compositions that contain pigments to impart color properties to the substrate for aesthetic purposes. The coated substrates are generally applied or affixed to specific carriers to provide a desired color to the object. For example, coated inorganic granules are often utilized on granule-surfaced bituminous roll roofing and asphalt shingles. The granules, which are partially embedded in one surface of asphalt-impregnated shingles or asphalt-coated fiber sheet material, form a coating which provides an inherently weather-resistant, fire resistant, and decorative exterior surface. The layer of roofing granules functions as a protective layer to shield the bituminous material and the base material from both solar (e.g. ultraviolet radiation) and environmental degradation.

Inorganic substrates are generally coated by applying a slurry containing an inorganic binder and pigment particles onto the substrate. In granular form, the inorganic material is heated in a rotary kiln and mixed with the slurry of inorganic binder and pigment particles. The coated inorganic granules are first dried and then fired at temperatures in excess of 170° C. to insolubilize the binder. The resulting coated granule has a hardened coating that exhibits a selected coloring due to the inclusion of the pigments.

Coated granules are often produced and selected to provide a desirable color to a finished structure or building. It is desirable that the color be consistent over time in order to maintain the appearance of the building. Discoloration of roofing shingles and other building materials due to algae infestation is has become especially problematic in recent years. Algae tend to grow on building materials in areas where moisture is retained. Discoloration has been attributed to blue-green algae, Gloeocapsa magma, transported as air-borne particles. The infestation may be particularly acute on asphalt shingles.

It would be an advantage to provide a coating composition that is capable of preventing algal growth on building materials which incorporate coated inorganic substrates.

SUMMARY OF THE INVENTION

The present invention provides a coating composition for substrates. The incorporation of the present invention onto substrates prevents algal growth on building materials utilizing the coated substrates. The present invention is directed to a coating composition, a coated article resulting from the application of the coating composition, and a process for coating an article with the inventive composition.

The coating composition of the present invention generally includes a silicate binder and a plurality of photocatalytic particles. The silicate binder functions as the bonding agent to establish the coating on the substrate. A plurality of photocatalyst particles are dispersed throughout the silicate binder. Upon insolubilization of the silicate binder, the plurality of photocatalytic particles are bound in the coating. The particles are included in an amount that provides sufficient distribution of the particles throughout the resulting coating. Sufficient distribution of the particles indicates that at least a portion of some of the individual particles are exposed on the surface of the coating to suppress or prevent algae growth. Preferably, the photocatalytic particles included in the coating composition are metal oxides. A particularly preferred metal oxide is anatase $TiO_2$.

The coating composition is applied onto substrates. The substrates suitable for use with invention must be capable of withstanding the firing temperatures of the coating process required to bond the silicate composition to the substrate. Preferred substrates include inorganic granules, rock, clay, ceramics, concrete or metal.

In one aspect of the invention, a plurality of roofing granules are produced. Each of the roofing granules includes an inorganic granule with a coating applied onto an outer surface of the inorganic granule. The coating includes an amount of silicate binder to bind the coating to the inorganic granule. The coating includes a plurality of photocatalytic particles. The photocatalytic particles are sufficiently distributed throughout the coating so that at least a portion of some of the particles are exposed on the surface of the coating.

The resulting article of the present invention, when utilized in building materials, shields the building materials from solar and environmental degradation. The resulting coating reduces the transmittance of UV radiation and thereby reduces exposure of the underlying substrate to solar degradation. The present invention is capable of reducing UV transmittance to about 2% or less, and preferably about 1% or less. The photocatalytic particles also prevent the growth of algae on the substrates containing the coating.

For purposes of the present invention, the following terms used in this application are defined as follows:

"granule" is used broadly and means compounds having a diameter from about 300 micrometers to about 1600 micrometers;

"inorganic granule" means granules of rock, mineral, clay, ceramic, or concrete;

"particle" means compounds having a mean particle size in the range of about 1 nm to about 1000 nm; and "algae resistant" means the capability to prevent or inhibit the growth of all forms of algae, including the form commonly associated with causing discoloration of roofs and other surfaces.

DETAILED DESCRIPTION

The present invention requires the application of a coating composition, containing a photocatalyst, onto a substrate. The coating composition is capable of preventing solar and environmental damage on the building materials utilizing a substrate coated with the inventive composition.

The coating composition of the present invention is generally an aqueous slurry containing an inorganic binder and a plurality of photocatalytic particles. The composition is heated at elevated temperatures to produce a ceramic-type coating on substrates. Thus, the composition must withstand temperatures of at least about 170° C., and preferably up to about 650° C., without exhibiting thermal degradation.

The function of the inorganic binder in the composition is to adhere the coating to a desired inorganic substrate. Preferably, the inorganic binder is an alkali metal silicate binding agent. Alkali silicate binding agents include those selected from the group consisting of lithium silicate, potassium silicate, sodium silicate, or combinations thereof. The alkali metal silicate is generally designated as $M_2O:SiO_2$, where M is lithium, potassium, or sodium. The weight ratio of $SiO_2$ to $M_2O$ ranges from about 1.4:1 to about 3.75:1. Preferably, the weight ratio in the range of about 2.75:1 to about 3.22:1. At about 38% to about 41% solids in solution, the amount of inorganic binder included in the coating composition is in the range of about 14 to about 30 parts by weight per thousand parts by weight of granules, and preferably in the range of about 17 to about 22 parts by weight per thousand parts by weight of granules.

A plurality of photocatalytic particles are included in the coating composition of the present invention. Photocatalysts, upon activation or exposure to sunlight, establish both oxidation and reduction sites. These sites are capable of preventing or inhibiting the growth of algae on the substrate. Photocatalytic particles conventionally recognized by those skilled in the art are suitable for use with the present invention. Preferred photocatalysts include transition metal photocatalysts. Examples of suitable transition metal photocatalysts include $TiO_2$, $ZnO$, $WO_3$, $SnO_2$, $CaTiO_3$, $Fe_2O_3$, $MoO_3$, $Nb_2O_5$, $Ti_xZr_{(1-x)}O_2$, $SiC$, $SrTiO_3$, $CdS$, $GaP$, $InP$, $GaAs$, $BaTiO_3$, $KNbO_3$, $Ta_2O_5$, $Bi_2O_3$, $NiO$, $Cu_2O$, $SiO_2$, $MoS_2$, $InPb$, $RuO_2$, $CeO_2$, $Ti(OH)_4$ or combinations thereof. Preferred photocatalyst are nanocrystalline anatase $TiO_2$. A most preferred transition metal catalyst is Catalite™ 4000, marketed by Power Surfaces, of Franklin, Tenn.

Optionally, the noted photocatalysts may be combined with a metal or metal oxide selected from the group consisting of Pt, Pd, Au, Os, Rh, $RuO_2$, Nb, Cu, Sn, Ni or Fe. The combination of the photocatalysts with the noted metals or metal oxides can improve the photocatalytic activity. The use of the noted metals and metal oxide are discussed in EP Patent No. 923988, U.S. Pat. No. 5,518,992, and U.S. Pat. No. 5,994,268, all hereinafter incorporated by reference.

Characteristics utilized to distinguish particles from one another include the mean particle size (primary particle size) and the surface area per weight of particles. The mean particle size is determined by electron microscopy under ASTM D3849. The surface area per weight of particles is determined through nitrogen absorption under ASTM D3037 or ASTM D4820.

The present invention utilizes a plurality of photocatalytic particles having a mean particle size in the range of about 1 nm to about 1000 nm. Preferred mean particle size is in the range of about 1 nm to about 100 nm, with a most preferred range of about 10 nm to about 50 nm. Particles having a surface area per weight of the particles of about 20 m²/g or more are generally included in the inventive composition. It is also preferred that the surface area per weight of the particles is 50 m²/g or more, and most preferably 100 m²/g or more. The photocatalytic particles are added to the slurry in an amount sufficient to achieve up to about 25 kg per 1000 kg of granules.

In accordance with the inventive composition, an aluminosilicate compound may optionally be added to the composition in order to neutralize the binder. Conventional aluminosilicate compounds are suitable for use with the present invention. The aluminosilicate compound is preferably a clay having the formula $Al_2Si_2O_5(OH)_4$. However, other aluminosilicate compounds, such as kaolin $(Al_2O_3.2SiO_2.2H_2O)$, may be utilized in practicing the present invention. The aluminosilicate compound is included in the composition in an amount sufficient to achieve a ratio of up to 15 parts by weight of aluminosilicate per 1000 parts by weight granules. Preferably, the ratio is 7 to 13 parts by weight of aluminosilicate per 1000 parts by weight granules. The particle size of the aluminosilicate compound may vary. However, it is generally preferred that the aluminosilicate contain less than 0.5 percent coarse particles (particles greater than 0.002 millimeters in diameter).

Optionally, pigments, or combinations thereof, may be included in the composition and mixed with the photocatalytic particles to achieve a desired color property. Suitable pigments would include, for example, compounds such as carbon black, titanium oxide (non-active or rutile), chromium oxide, yellow iron oxide, phthalocyanine green and blue, ultramarine blue, red iron oxide, metal ferrites, and mixtures thereof. Other conventional pigments are also suitable for use with the present invention. Those skilled in the art are capable of determining amounts of additional pigments needed in a composition to achieve a specific color property. The mean particle sizes of the noted pigments may vary. Certain pigments may possess a photocatalytic phase. However, the photocatalytic phases of those pigments were not utilized as pigments in coating applications.

Optionally, dispersants may be added to the composition to assist in dispersing the optional pigment particles, throughout the composition. The appropriate level of dispersion of particles in the slurry will assist in achieving a coating on a granular substrate having a greater uniformity in color. Both anionic and non-ionic dispersants may be suitable for use with the present invention. The dispersant is typically used in an amount ranging up to about 20 weight percent of the pigment particles, and preferably up to about 10 weight percent of the pigment particles. An example of a dispersant is the sodium salt of sulfonated naphthalene-formaldehyde condensate marketed as Rhodacal N from Rhodia in Cranbury, N.J.

Other optional compounds include zinc oxides and borates. These compounds are described in U.S. Pat. No. 5,411,803, which is herein incorporated by reference.

In preparing the composition for application to an inorganic substrate, the inorganic binder is first mixed with a portion of water. The amount of water may vary depending upon the type of binder utilized. With a sodium silicate binder, water is added to achieve a ratio of about 1 part water by weight to about 2 parts sodium silicate solution (38%–41% solids in solution) by weight. The amounts may vary depending upon the inorganic binder and other optional ingredients. The photocatalytic particles are then added to the composition along with any of the other optional ingredients.

The composition of the present invention is applied onto a substrate. Substrates capable of withstanding the application temperatures of the coating composition are suitable for use with the invention. Preferred substrates include inorganic granules, rock, clay, ceramic, concrete, and metal materials. Plastic composition capable of withstanding the insolubilization temperatures may also be utilized as substrates for the present invention. Most preferred inorganic substrates are generally rock, mineral, or recycled material (e.g. slag) in granular form that is capable of receiving a coating. Suitable inorganic materials for the substrates include those selected from the group consisting of argillite, greenstone, granite, trap rock, silica sand, slate, nepheline syenite, greystone, crushed quartz, and slag. Generally, the inorganic material is crushed to a particle size having a diameter in the range from about 300 micrometers to about 1600 micrometers.

The composition of the present invention is applied onto the substrate to form a coating on the outer surface of the substrate. For purposes of the invention, coating is used to describe one or more layers of coatings applied onto the substrate through the use of the present inventive composition. For purposes of the invention, the term "coating" is preferably directed to the complete covering of the base granule, although this is not specifically required. The process for coating the substrates is generally disclosed in U.S. Pat. No. 5,411,803, herein incorporated by reference. The granules are initially preheated in a rotary kiln, or equivalent means, to a temperature of about 65° C. to about 140° C. The coating composition is then applied to uniformly coat the granules.

The rate of application for the composition to the granule may vary depending on the range of components within the composition. Those skilled in the art are capable of determining this proper rate based upon the ranges previously noted for all components. The heat of the granules drives off some of the water in the coating to achieve a moisture level of about 0.6% to about 1%. The coated substrates are then heated to temperatures necessary to provide insolubilization of the inorganic binder and thus form a ceramic coated inorganic granule. The insolubilization of the binder renders the binder sufficiently resistant to dissolution in water or bituminous material. The heating, or firing, of the coating composition takes place at temperatures in the range of about 170° C. to about 650° C. and preferably 200° C. to about 538° C.

Depending on the inorganic material and desired end use, the coated substrates may optionally be post-treated to improve the handling of the material or to enhance the adhesion of the coated substrate to other substrates. Typical treatments, though not the subject of the present invention, include hydrocarbon oils, silicones and inorganic chemical solutions, such as solutions of magnesium chloride, and the like. One useful silicone is known under the trade designation "Tegosivin HL15M7" an organosiloxane silicone oil, available from Goldschmidt Chemical, Hopewell, Va. Traditionally, slate oil, such as that available from Cross Oil & Refining Co. Inc., Smackover, Ariz., has been utilized for dust control. The compounds are added to the coated substrates in an amount ranging from about 0.0025 to about 0.7 weight percent of the granule, depending on the material. Those skilled in the art are capable of determining the proper amount needed to achieve a desired result. The additives are generally applied during the cooling step of the coating process.

The resulting coated substrates of the present invention exhibit a durable coating containing the photocatalytic particles. The photocatalytic particles are sufficiently distributed throughout the coating so that at least a portion of some of the particles are exposed on the surface of the coating. The coated articles, when utilized in building materials, are capable of significantly reducing solar or environmental degradation on the building materials incorporating the present invention. The present invention reduces the transmission of ultraviolet radiation as exhibited through the UV transmission test desribed in the "Examples" section. When the coating composition is utilized to coat roofing granules, the granules prevent transmission of light, particularly ultraviolet light, from reaching the underlying coating asphalt. Exposure of asphalts to UV light, especially light in the range from approximately 290 nm to 430 nm, is known to accelerate undesirable weathering of the asphalt resulting in water solubility, loss of thermoplasticity, cracking, and ultimately failure of the shingle. As a result, the adhesive bond between the asphalt to the granules is destroyed and the granules become removed from the asphaltic base.

The percentage of the actinic light transmitted by the granules is one means to evaluate the propensity for different granules to remain adhered to the coating asphalt. It is generally desirable to have granules with lower percentages of UV light transmittance as they provide better weather resistance for the shingle and result in less granule loss over time. The coating compositions of the present invention are capable of reducing the UV light transmittance to about 2% or less according to the UV Transmittance test. Preferably, the UV transmittance is about 1% or less.

The coated inorganic substrates of the present invention can prevent the growth of various forms of algae on a coated substrate. Upon exposure to UV radiation, the photocatalytic particles provide an environment that prevents or inhibits algae growth. The Accelerated Algae Growth Prevention Test, described in the "Examples" section indicates a test for determining the coated articles efficacy in destroying algae. The present invention resulted in no algal growth according to test standards.

The coated granules of the present invention are ideally suited for use in various applications in building materials in areas where the materials are susceptible to algae growth. For example, the coated granules are well suited for use as roofing granules. The coated granules may be applied to warm bituminous coated shingle base material of a felt or fiberglass. Additionally, the coated granules of the present invention may be used in various interior and exterior products such as, for example, roofing materials, concrete and cement based materials, plasters, asphalts, ceramics, stucco, grout, plastics, and glass. Additional examples include pool surfaces, wall coverings, siding materials, flooring, filtration systems, cooling towers, buoys, seawalls, retaining walls, docks, and canals so as to provide a surface capable of remaining free from discoloration.

The following non-limiting examples further illustrate the present invention. Unless otherwise indicated, the following test procedures were used in the examples. The particular materials and amounts recited in these examples, as well as other conditions and details, are to be interpreted broadly in the art and should not be construed to unduly restrict or limit the invention in any way.

The test procedures utilized in these examples are as described below.

1. UV Transmittance Test:

The UV transmittance test procedure was used to discover the effectiveness of the addition of photocatalytic particles to the granule coating in preventing UV light transmission. Surprisingly it was found that granules coated with relatively low loading levels of photocatalytic anatase $TiO_2$ allowed significantly less UV transmission than similarly coated granules with higher loading levels of pigment grade (non photocatalytically active) rutile $TiO_2$.

In order to obtain a narrow, uniform size distribution of granules to test, the granules to be tested were screened using 10 and 12 mesh screens. The granules passing through the 10 mesh but retained on the 12 mesh screen were chosen for testing. Individual granules were then carefully placed into each of the funnel shaped holes on an opaque lower template. The template consists of 100 evenly spaced funnel shaped holes such that the granules fit into the larger end of the hole but not the smaller end allowing only light transmitted through the granules to pass through the holes. A similar template was then place upside down relative to the first template on top of the first template in order hold the granules in place and provide a smooth flat surface for the placement of film sensitive to light in the UV range. The templates also contain a row of 10 holes separate from the grid of 100 holes. A step wedge is placed over this row of 10 holes on the lower template such that each of the 10 holes allows a progressively greater transmittance of light than the previous hole. The two templates are supported on the top of an opaque box containing a lamp fitted with General Electric R-2 photoflood bulb. The top of this box contains a filter which cuts off light above approximately 430 nm but allows wavelengths below this to pass through onto the exposed portion of the granules in the lower template and onto the holes with the step wedge filter. The UV sensitive film, Kodak Polychromate III film, was placed face down covering the holes in the templates including the wedge holes. A plate was placed over the film to hold it in place. The light was turned on to expose the film in areas where light was transmitted through the granules. A timer was used to control the time of exposure such that the first of the step wedge holes resulted in a barely visible exposure mark on the film. This allows for consistent exposure of the granules between different trials.

After exposure and development of the film, the number of visible spots resulting from the grid of 100 holes containing granules were counted and recorded as a percentage. The lower the percentage the more effective the granules were at preventing UV transmittance and the better they fulfill this criteria for roofing granules.

2. Accelerated Algae Growth Prevention Test

In order to evaluate the algae growth prevention properties of actual shingle samples in an accelerated laboratory setting the following test procedure was used. This procedure allows for the evaluation of various photocatalytic formulations in a complete shingle sample in order to simulate the actual roof environment. Furthermore a growth media simulating actual urban rain was also used in order to account for any components in rain water that might affect the photocatalytic activity.

The test apparatus consists of a series of plastic bottles 10 cm in diameter laid lengthwise on a Bellco Cell Production Roller base manufactured by Bellco Glass Inc. of Vineland, N.J. Above the bottles is a bank of lamps providing both visible and ultraviolet light approximating the range of light available on a roof although at a lower intensity. The light bank consists of 23 W Sylvania soft white DuluzR compact fluorescent bulbs, a 20 W RS UV-B medical light with a spectral maximum at 310 nm (model 'TL', Phillips, Holland), and 15 W black lights with a spectral maximum at 368 nm (model F15T8-BL, General Electric). The full illumination from these lamps provides a continuous photon flux density in the visible range of 330 micromol photons per square meter per second, with a UV-A maxima of 0.38 mW per square centimeter and a UV-B maxima of 0.08 mW per square centimeter.

Approximately 5 cm wide shingle samples are placed inside the bottles such that they curl along the inside surface of the bottle, one sample per bottle. The top surface of the shingle sample is facing toward the center of the bottle. The growth medium (approximately 100 ml) is added to each bottle. Approximately 12 ml of stationary phase culture of Gloeocapsa is diluted to 25 ml with the urban rain medium and 1 ml used to inoculate each bottle. The test is conducted at room temperature. The roller base slowly rotated the plastic bottles throughout the test period keeping the enclosed shingle sample wet and in contact with the culture but also in contact with the air (the sample is not continuously submerged). The test was run for at least 4 weeks to allow time for cell growth to occur. The shingle samples were then visually evaluated for the presence of algae growth established on the shingle surface.

The medium formulation used is described below:
100× concentrated rain stock contains:

| | |
|---|---|
| $MgCl_2.6H_2O$ | 12.6 mg |
| KCl | 4.12 mg |
| NaCl | 5.96 mg |
| $NaNO_3$ | 11.3 mg |
| $NH_4NO_3$ | 97.6 mg |
| $CaSO_4.1/2\ H_2O$ | 32.7 mg |

Made up to 1 liter with water. Diluted to 1× for working solution (1 liter of 1× rain stock). Concentrated $H_2SO_4$ is diluted 1:10 (to 180 mM) and 67 microliters are added to 1 liter of the 1× rain stock. Concentrated $HNO_3$ is diluted 1:10 (to 158 mM) and 37.2 microliters were added to 1 liter of the 1× rain stock to provide the final simulated urban rain medium.

3. Accelerated Exterior Algae Growth Prevention Test

In order to evaluate shingles incorporating the principals of the present invention on preventing algae growth in an exterior environment the following test procedure was used. In this test the shingle samples were exposed to the environment near Houston, Tex.

In each test, a new shingle sample made or treated in accordance with the present invention was attached to a north-facing panel board, which was positioned at an angle to the horizontal of 45 degrees. Each shingle sample had a row of old non algae resistant asphalt shingles which were heavily infested and discolored by the presence of Gloeocapsa algae at the start of the test attached at the top edge of the inclined panel. This "seed" shingle then allowed for the accelerated introduction of the discoloring roof algae to the test shingle located directly below.

These test shingles were monitored every 6 months for algae growth by making a visual review of the shingles and rating the level of discoloration due to algae growth. The visual rating is from 1 to 5, where 1 is no algae and 5 is complete algal infestation. The rate at which a test shingle progresses from the initial 1 rating to a final 5 rating is compared the rate observed for a control shingle, which is a standard commercially available, non algae resistant, white shingle.

4. Accelerated Weathering Test

In order to evaluate shingles incorporating the present invention for weathering performance and durability samples were tested using a standard Xenon 3-1 weatherometer from Atlas Electric Device Company of Chicago, Ill. This instrument allows samples to be placed in a closed chamber and exposed to an environment of controlled temperature, moisture, and light. The procedure used is described in ASTM standard G26 Type B, incorporated herein by reference. The samples are exposed to a repeating cycle of 102 minutes at 63° C. without water followed by 18 minutes of water spray. The light was kept on for the duration of the test. The samples were removed from the weatherometer after 2000 hours and evaluated in comparison to a control sample for visual appearance, cracking of the substrate, and granule loss.

5. Alkalinity Test

This test provides a measure of the unbound, soluble alkali metal content remaining in a ceramic coating made from reacting an alkali metal silicate and an aluminosilicate clay. The silicate binder reacts (when calcined at temperatures preferably at about 500° C.) with an aluminosilicate clay, and the reaction product forms a water insoluble ceramic coating. The remaining soluble alkali metal (most typically in the form of NaCl or other alkali metal chlorides) is an indirect measure of the extent of insolubilization of the ceramic coating. This test provides important insight in to whether or not in the example of adding the photocatalytic particles to the ceramic granule color coating, the photocatalytic particles result in a degradation of the original quality of that coating. Since this coating serves as the binder for the photocatalytic particles, its durability (insolubility) is an essential requirement in obtaining long-lasting algae resistant granules.

For each test run, 100 milliliters (ml) of boiling water was poured into an Erlenmeyer flask (which had previously been boiled free of soluble alkali). Twenty-five grams of granules to be tested were added to the boiling water as were 3 drops of phenolphthalein indicator (turning point pH=9, where "pH" is defined as the negative base ten logarithm of the hydrogen ion concentration). The water, granules, and indicator were boiled for a period of 15 minutes. Decantation of the boiling water was performed into an Erlenmeyer flask. Approximately 10 ml of fresh cold distilled water was then added onto the boiled granules and swirled. The water was then added to the original boiled water that had already been decanted.

The total amount of water was then titrated to end-point using a digital buret tritration device commercially available from the Brinkmann Company Instruments Inc. of Westbury, N.Y. If the solution was pink immediately after addition of the indicator, that indicated the solution had a pH above 9.0, so the solution was titrated with acid (0.1 N sulfuric acid). If the solution was not pink immediately after addition of the indicator, the solution had a pH less than 9.0, and thus needed to be titrated to end-point using a base (0.1 N sodium hydroxide).

The ml of acid or base required to reach end-point is called the "alkalinity." The alkalinity is positive when using acid, negative when using base tritrant. For granular materials of the invention, any alkalinity result between −2.0 and +2.0 is acceptable. In general alkalinity values that are less than 0.2 units apart are considered to be essentially the same value.

EXAMPLES 1 THRU 9 AND COMPARATIVE EXAMPLE A

Photocatalytic Roofing Granules as a UV Blocker

The procedure described above for measuring UV transmittance was used in this example to demonstrate that a desirable reduction in UV transmittance was obtained with granules containing photocatalytic particles in their coating. The results obtained for granules containing photocatalytic $TiO_2$ particles are tabulated below versus the uncoated base rock, and the same base rock coated with a non photocatalytic rutile $TiO_2$ pigment. The ISK ST-O1 material was an anatase $TiO_2$ obtained from Ishihara Sangyo Kaisha, Ltd in Japan. The Titanium Dioxide P25 material is a blend of rutile and anatase crystal structures of $TiO_2$ obtained from Degussa-Hüls Corporation in Germany. Samples tested in table 1 are all roofing granules and were prepared as follows. A slurry was mixed using 12 parts kaolin clay, 20 parts aqueous sodium silicate solution (39.4% solids, 2.75 ratio $SiO_2$ to $Na_2O$), 0.5 parts borax, 10 parts water, and an amount of photocatalytic particles or rutile $TiO_2$ as indicated by the final weight percent in table 1 (this weight percent is based on the percent of additive relative to the total weight of the coated granule). In each case this slurry was mixed in a mixer at room temperature with a laboratory scale mixer for about 5 minutes. Grade #11 nepheline syenite granules (−10/+35 US mesh size) were preheated to 104° C. while tumbling through a rotary mixer at a rate of about 908 kg per hour. The slurry was then coated onto the preheated granules by mixing the preheated granules and slurry in the rotary mixer. The slurry-coated granules were then transferred to a rotary kiln and fired at 510° C. with an excess oxygen in the kiln of about 10% for about 2 minutes and then cooled.

As the results in table 1 indicate, there is a significant reduction in the amount of ultraviolet light allowed to transmit through granules which have a coating containing photocatalytic particles relative to the amount of UV light transmitted by uncoated granules, as well as granules coated with rutile $TiO_2$. It is surprising to find such an improvement in the opacity performance with concentrations of photocatalytic particles even an order of magnitude less than the traditionally employed levels of rutile $TiO_2$. It should also be noted that the photocatalytic particles are able to provide this improvement with or without the additional presence of the white pigment grade rutile $TiO_2$. This indicates that this benefit can be obtained in other desirable coating colors, not just white.

In addition the granules in table 1 were all tested submitted to the alkalinity test described previously. All granules samples were found to have alkalinities within the acceptable parameters of −2.0 to +2.0. This indicates that there is no interference of the photocatalytic particles in the cure of the ceramic coating and that the coating meets traditional roofing granule requirements for insolubility.

TABLE 1

Results of UV Transmittance Test. Coating refers to a fired silicate and aluminosilicate clay ceramic containing the indicated weight percent of additive.

| Example # | Example Description | Transmittance (%) |
| --- | --- | --- |
| 1 | Granules coated with 0.05% ISK ST-01 | 0% |
| 2 | Granules coated with 0.10% ISK ST-01 | 1% |
| 3 | Granules coated with 0.15% ISK ST-01 | 1% |
| 4 | Granules coated with 0.05% P25 | 2% |
| 5 | Granules coated with 0.10% P25 | 1% |
| 6 | Granules coated with 0.15% P25 | 0% |
| 7 | Uncoated base rock granules | 18% |
| 8 | Granules coated with 0.70% rutile $TiO_2$ + 0.15% P25 | 2% |
| 9 | Granules coated with 0.70% rutile $TiO_2$ + 0.15% ISK ST-01 | 1% |
| A | Granules coated with ~0.70% rutile $TiO_2$ | 7% |

EXAMPLES 10 THRU 20 AND COMPARATIVE EXAMPLE B

Algae Resistance of Catalytic Roofing Granules.

The accelerated algae growth prevention test described above was used in this example to demonstrate that a desirable resistance to algae growth was obtained with asphalt shingle samples containing roofing granules with photocatalytic particles in their ceramic coating.

The ISK ST-O1 material was an anatase $TiO_2$ obtained from Ishihara Sangyo Kaisha, Ltd Japan. The Titanium Dioxide P25 material was a blend of rutile and anatase crystal structures of $TiO_2$ obtained from Degussa-Hüls Corporation in Germany. The Catalite™ 4000 photocatalytic material was obtained from Power Surfaces, Inc. from Franklin, Tenn. Samples were prepared by treating the granules as described in examples 1 thru 9 and applying these granules to a heat softened asphalt coated mat. The applied granules were pressed into the asphalt such that they were partially embedded in the asphalt. Asphalt coated fiberglass mat spreads were previously prepared using a pilot scale shingle maker. A shingle sample preparation oven was preheated to 182° C. A number of 10.2 centimeter (cm)×30.5 cm panels were cut from the asphalt coated fiberglass mat spreads. These panels were placed on a tray in the oven for 3 to 4 minutes to melt the asphalt sufficiently so that granules could be applied thereto. (The asphalt was sufficiently heated when it just ran off the fiberglass spread and had a glossy, shiny appearance.)

A granule delivery jar was filled with about 125 grams of granules. The jar was then covered with a lid having a predetermined number and spacing of holes so that an even distribution of granules was obtained on the granule-coated panel. For grade 11 granules, 0.64 cm diameter holes were used.

Silicone release agent was applied to a stainless steel tray and to a spatula. The spatula was used to transfer the asphalt coated fiberglass mat from oven to the stainless steel tray. Immediately (in no more than 8 seconds) thereafter a quantity of granules sufficient to just cover the panel were applied using the delivery jar. The stainless steel tray was than tipped and lightly shaken to remove excess granules. The granules still sticking to the asphalt were then quickly embedded into the asphalt with the bottom of a 250 ml Erlenmeyer flask, being careful not to dig the granules into the soft asphalt. Immediately thereafter, a second quantity of granules were applied, the tray tipped and shaken, and the granules embedded. The object was not to have every space of asphalt covered but to ensure that the granules were well embedded and surrounded with asphalt. The granule coated panel (shingle sample) was than placed on a flat surface to cool to room temperature (about 25° C.). From the cooled shingle sample a 5.1 cm×22 cm piece was cut and used in the accelerated algae growth prevention test as described earlier.

Table 2 below indicates that comparative example B, asphalt shingle samples containing a surface coating of roofing granules with a pigment grade rutile $TiO_2$ in the fired silicate coating and no photocatalytic particles, shows no resistance to algae growth. The asphalt shingle samples containing a surface covering of roofing granules containing various amounts of the photocatalytic particles in the fired silicate coating (examples 10 thru 20) are resistant to algae growth despite the UV opaque nature of the granule coating. Furthermore, a lower weight percent of photocatalytic particles can be used to provide algae resistance than the amount of rutile $TiO_2$ necessary to deliver a white color to the granules. This provides an additional unexpected benefit in that the photocatalytic particles can be used with little impact on the desired color of the roofing granules.

TABLE 2

Results from accelerated algae tests of asphalt shingles containing photocatalytic roofing granules.

| Example # | Example Description* | Result |
| --- | --- | --- |
| 10 | Granules coated with 0.05% ISK ST-01 | No alga growth |
| 11 | Granules coated with 0.10% ISK ST-01 | No alga growth |
| 12 | Granules coated with 0.15% ISK ST-01 | No alga growth |
| 13 | Granules coated with 2.0% ISK ST-01 | No alga growth |
| 14 | Granules coated with 0.05% P25 | Slight presence of algae |
| 15 | Granules coated with 0.10% P25 | No alga growth |
| 16 | Granules coated with 0.15% P25 | No alga growth |
| 17 | Granules coated with 0.05% Catalite ™ | No alga growth |
| 18 | Granules coated with 0.10% Catalite ™ | No alga growth |
| 19 | Granules coated with 0.15% Catalite ™ | No alga growth |
| 20 | Granules coated with 1.0% Catalite ™ | No alga growth |
| B | Granules coated with ~0.70% rutile $TiO_2$ | Brown growth on shingle |

*Coating percentages are weight percentages of the indicated component relative to the total weight of the coated granule.

EXAMPLES 21 AND 22

Non-Leaching, Long Term Algae Resistance of Photocatalytic Granules.

In order to evaluate the longevity of the algae resistance of shingles prepared according to the present invention, it was necessary to demonstrate that algae resistance was retained even after considerable exposure to weathering conditions. Examples 21 and 22 demonstrate that the photocatalytic particles remain in the binder (non-leaching) and remain active even after accelerated weathering. This non-leaching mechanism provides a significant advantage over the current state of the art in algae resistant roofing which requires large reservoirs of polyvalent metal ions, such as copper, tin, or zinc, in order to provide sufficient material that can leach out and control algae growth over long periods of time.

Shingle samples for examples 21 and 22 were prepared using granules prepared as described in Examples 1–9 and the shingle making method of Examples 10–20. The samples were then subjected to accelerated weathering in a Xenon 3-1 weatherometer for 2000 hours according to the previously described method. Observation of the samples after exposure in the weatherometer showed no significant or unusual cracking of the asphalt or loss of granules from the asphalt. Thereafter the samples were then evaluated using the accelerated algae growth prevention test. The results, summarized in table 3, show that the shingle samples continue to resist algae growth.

TABLE 3

Results from accelerated algae tests of asphalt shingles containing photocatalytic roofing granules after accelerated weathering.

| Example # | Example Description* | Result |
| --- | --- | --- |
| 21 | Granules coated with 2.0% ISK ST-01 | No alga growth |
| 22 | Granules coated with 1.0% Catalite ™ | No alga growth |

*Coating percentages are weight percentages of the indicated component relative to the total weight of the coated granule.

EXAMPLES 23 THRU 27

Exterior Algae Resistance of Shingles Containing Photocatalytic Roofing Granules.

The granules and shingles used in examples 23 through 27 were prepared using granules prepared as described in Examples 1–9 and the shingle making method of Examples 10–20. In accordance with the previously described test procedure for accelerated exterior algae testing panels containing the sample shingles were placed on exterior exposure near Houston, Tex. These panels were monitored at least every six months for algae growth on the test shingles and rated 1 to 5, where 1 is no algae growth and 5 is complete algae infestation. As shown in table 4 all shingles incorporating the present invention rated a 1.

TABLE 4

Results from accelerated exterior algae tests of asphalt shingles containing roofing granules as described in the example descriptions.

| Example # | Example Description * | Result (rating) |
|---|---|---|
| 23 | Granules coated with 0.15% ISK ST-01 | (1) No alga growth at 6 mos. |
| 24 | Granules coated with 2.0% ISK ST-01 | (1) No alga growth at 6 mos. |
| 25 | Granules coated with 0.15% P25 | (1) No alga growth at 6 mos. |
| 26 | Granules coated with 0.15% Catalite ™ | (1) No alga growth at 1.3 yr. |
| 27 | Granules coated with 1.0% Catalite ™ | (1) No alga growth at 1.3 yr. |

* Coating percentages are weight percentages of the indicated component relative to the total weight of the coated granule.

In accordance with the provisions of the patent statutes, the present invention has been described in what is considered to represent its preferred embodiment. However, it should be noted that the invention can be practiced otherwise than as specifically illustrated and described without departing from its spirit and scope.

What is claimed is:

1. A coating composition comprising:

a plurality of photocatalytic particles and an alkali metal silicate binder, wherein the alkali metal silicate binder further comprises an aluminosilicate compound.

2. The coating composition of claim 1, wherein said photocatalytic particles comprise a material selected from $TiO_2$, $ZnO$, $WO_3$, $SnO_2$, $CaTiO_3$, $Fe_2O_3$, $MoO_3$, $Nb_2O_5$, $Ti_xZr_{(1-x)}O_2$, $SiC$, $SrTiO_3$, $CdS$, $GaP$, $InP$, $GaAs$, $BaTiO_3$, $KNbO_3$, $Ta_2O_5$, $Bi_2O_3$, $NiO$, $Cu_2O$, $SiO_2$, $MoS_2$, $InPb$, $RuO_2$, $CeO_2$, $Ti(OH)_4$ or combinations thereof.

3. The coating composition of claim 1, wherein said photocatalytic particles have a mean particle size in the range of about 1 nm to about 1000 nm.

4. The coating composition of claim 1, wherein said composition further includes colored pigments.

5. The coating composition of claim 1, wherein the photocatalytic particles are provided in an amont effective to suppress or prevent algae growth.

6. The coating composition of claim 1 wherein the aluminosilicate compound is a clay.

7. The coating composition of claim 6 wherein the clay is kaolin.

* * * * *

UNITED STATES PATENT AND TRADEMARK OFFICE
CERTIFICATE OF CORRECTION

PATENT NO. : 6,881,701 B2
DATED : April 19, 2005
INVENTOR(S) : Jacobs, Jeffry L.

It is certified that error appears in the above-identified patent and that said Letters Patent is hereby corrected as shown below:

<u>Title page,</u>
Item [56], References Cited, OTHER PUBLICATIONS, "Wang et al." reference, after "Report," delete "1997,"; "Zhang et al." reference, delete "TiO2-based" and insert -- $TiO_2$-based --, therefor.

<u>Column 5,</u>
Line 66, delete "desribed" and insert -- described --, therefor.

<u>Column 8,</u>
Line 14, delete "MgCl2.6H2O" and insert -- $MgCl_2.6H_2O$ --, therefor.
Line 17, delete "NaNO3" and insert -- $NaNO_3$ --, therefor.
Line 18, delete "NH4NO3" and insert -- $NH_4NO_3$ --, therefor.
Line 19, delete "CaSO4.1/2 H2O" and insert -- $CaSO_4.1/2\ H_2O$ --, therefor.

<u>Column 10,</u>
Line 60, delete "Catalytic" and insert -- Photocatalytic --, therefor.
Line 67, after "Ltd" insert -- in --.

<u>Column 12,</u>
Line 25, after "Photocatalytic" insert -- roofing --.

<u>Column 14,</u>
Line 23, delete "amont" and insert -- amount --, therefor.

Signed and Sealed this

Thirtieth Day of August, 2005

JON W. DUDAS
*Director of the United States Patent and Trademark Office*